350/169

SEARCH ROOM

United States Patent

[11] 3,598,472

| [72] | Inventor | Peter Kaiser<br>Middletown, N.J. |
| [21] | Appl. No. | 882,416 |
| [22] | Filed | Dec. 5, 1969 |
| [45] | Patented | Aug. 10, 1971 |
| [73] | Assignee | Bell Telephone Laboratories, Incorporated<br>Murray Hill, N.J.<br>Continuation-in-part of application Ser. No.<br>759,069, Sept. 11, 1968, now abandoned. |

[54] COUNTERFLOW GAS LENSES
10 Claims, 11 Drawing Figs.

| [52] | U.S. Cl. | 350/179, 350/96 WG, 350/175 GN |
| [51] | Int. Cl. | G02b 3/12 |
| [50] | Field of Search | 350/179, 175 GN, 96 WG |

[56] References Cited
UNITED STATES PATENTS

| 3,413,059 | 11/1968 | Berreman | 350/179 |
| 3,441,337 | 4/1969 | Miller | 350/179 X |
| 3,442,574 | 5/1969 | Marcatili | 350/179 |

*Primary Examiner*—John K. Corbin
*Attorneys*—R. J. Guenther and Arthur J. Torsiglieri ABSTRACT: In the optical guiding apparatus disclosed, counterflow gas lenses are provided with improved focusing properties by providing radial exhaust of the hot gases before they cool significantly. Substantial radial symmetry of the exhaust provides stable stagnation regions at the junctures of the counter flows. A relatively long conduit section is employed to develop laminar flow of the inlet gas and to permit relatively high gas velocities that make gravity aberrations negligible. To further reduce gravity aberrations, the exhaust ends of the lens halves may be lifted with respect to the inlet ends of the lens halves.

FIG. 5 GAS-RECIRCULATING ARRANGEMENT

COUNTERFLOW GAS LENSES

CROSS-REFERENCE TO RELATED APPLICATION

This is a continuation-in-part of my copending application, Ser. No. 759,069, filed Sept. 11, 1968, now abandoned.

BACKGROUND OF THE INVENTION

This invention relates to counterflow gas lenses useful for guiding beams of light through protective conduits. For clarity and convenience, the combination of lenses and protective conduit will be termed an optical guiding apparatus.

It has become clear that in future optical communication systems transmission should occur within a conduit that shields the modulated light beam from snow and rain and other causes of loss or interruption. The diameter of this conduit is many times the wavelength of the light being transmitted. Since sufficiently smooth interior surfaces would be too expensive to produce, the light beam must repeatedly be refocused and possibly repositioned to be kept away from the conduit walls.

Effective guidance around bends comparable to those of superhighways, such as those having minimum radii of curvature of 1 kilometer, requires the lenses to be spaced about 1 meter apart. The losses inherent in conventional glass lenses are intolerably high for this close spacing; and the search for an appropriate focusing element has led to the development of the gas lens.

The gas lens utilizes refractive index variations in gases, which in the particular case of the extensively studied thermal gas lens are due to thermal gradients. These thermal index gradients are typically produced by the laminar flow of a cool gas through a heated cylindrical tube. Since Rayleigh scattering loss is practically the only loss present, the attenuation in such guides is extremely low. Nevertheless, lens imperfections produced by gravity and spherical aberrations produce transverse mode conversion that represents a potential loss that can be of major importance. By transverse mode conversion, I mean that some energy from the fundamental transverse mode, which has a Gaussian intensity distribution through a beam cross section, is converted to higher order modes which have one or more intensity nodes in the comparable beam cross section. A node is an intermediate region of zero intensity.

Unless the receiver can extract information equally easily from all transverse modes, the mode conversion results in a loss. Also, higher order modes result in a broader beam; and, unless some provision is made to prevent the accumulation of energy in these modes, the beam will finally hit the wall of the guiding structure and will be lost for communication purposes.

The distortions of the Gaussian beam profile resulting from transverse mode conversion have been shown to limit severely the maximum number of lenses employable between repeaters. As a corrective measure, devices such as repositioners, refocusers and mode filters have to be incorporated into the guide to restore the transverse mode purity of the beam before the beam continues to propagate through another limited sequence of gas lenses.

It has previously been shown theoretically that counterflow arrangements of thermal gas lenses, with either injection or exhaust of gases from a common region, have slightly reduced spherical aberrations when compared with unidirectional flow arrangements. The analysis by D. Marcuse, *Bell System Technical Journal*, 45 p. 1345, at pp 1363 and 1364, (Oct., 1966), demonstrates this fact but neglects gravity forces.

SUMMARY OF THE INVENTION

I have discovered that the gravity aberrations of the thermal gas lenses in an optical guiding apparatus can be greatly reduced by exhausting the heated gas radially before the gas cools appreciably. Radial symmetry of the exhaust is advantageously achieved by either the appropriately arranged confluence of the opposing gas flows in a counterflow lens or the stagnation flow of the exhaust gas in front of a glass plate at the end of a single-flow lens. It has been found that the stagnation regions are stable and do not impair the focusing. The presence of a glass plate excludes the unidirectional flow lens and leaves the counterflow lens with center exhaust as the preferred thermal gas lens for such optical beam guiding apparatuses.

Moreover, I have found that a variety of arrangements for smoothing the inlet flow of gases to provide laminar flow before heating can permit higher gas velocities than in prior arrangements and consequently reduce gravity aberrations.

According to another feature of my invention, gravity aberrations can be further reduced by lifting the exhaust portions of the lens halves with respect to the inlet portions of the lens halves.

BRIEF DESCRIPTION OF THE DRAWING

Further features and advantages of my invention may be obtained from the following detailed description, taKen together with the drawing, in which.

DESCRIPTION OF ILLUSTRATIVE EMBODIMENTS

Figure 1:
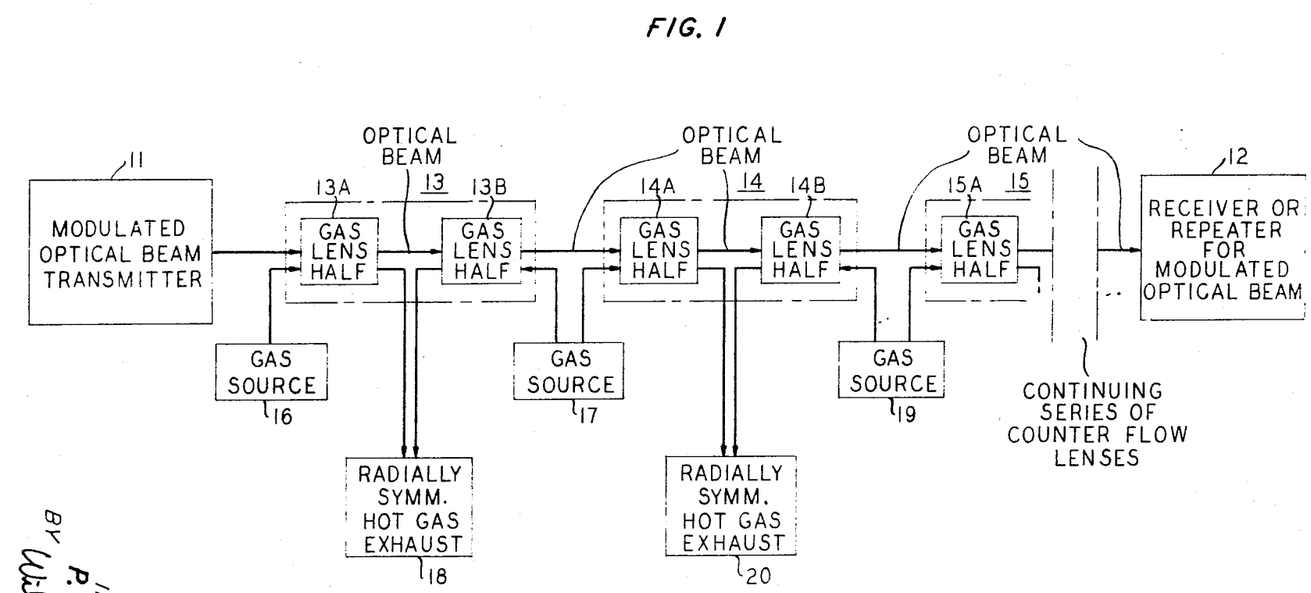
FIG. 1 is a block diagrammatic illustration of an embodiment of my invention.

In the embodiment of FIG. 1, it is desired to transmit a modulated beam of coherent light from a transmitter 11 to a receiver 12 through a series of gas lenses 13, 14, 15 et cetera, which are shown block diagrammatically, but which typically are disposed in a protective conduit.

For maximum protection from environmental disturbances, the conduit including the gas lenses would typically be buried in the ground. In view of the cost of acquiring suitable right-of-way, such a system might follow superhighways and other existing public rights-of-way. It must also follow the local terrain uphill and downhill. The optical beam must therefore be caused to bend around a curve of radius of curvature at least as small as 1 kilometer.

This result is advantageously achieved in the embodiment of FIG. 1 by employing counterflow gas lenses with radially symmetrical exhaust of the hot gases. Thus, lens 13 consists of two halves, 13A and 13B, through which the optical beam passes in sequence, but which are supplied with gas from sources 16 and 17 from opposed ends so that the gases in the two lens halves, 13A and 13B, flow toward a confluence at the juncture of the two halves. At the juncture of gas lens halves 13A and 13B, an exhaust 18 is provided and adapted radially symmetrically to remove the hot gases before they can cool substantially. Similarly, lens 14 consists of two halves, 14A and 14B, supplied from sources 17 and 19, respectively, and coupled together at the radially symmetrical hot gas exhaust 20. Similarly, the first half of lens 15 is 15A, supplied from source 19. Such a series of counterflow lenses is continued until the optical beam passing through 13A and 13B, 14A and 14B, and 15A reaches a repeater or receiver 12 of the modulated optical beam.

Figure 2:
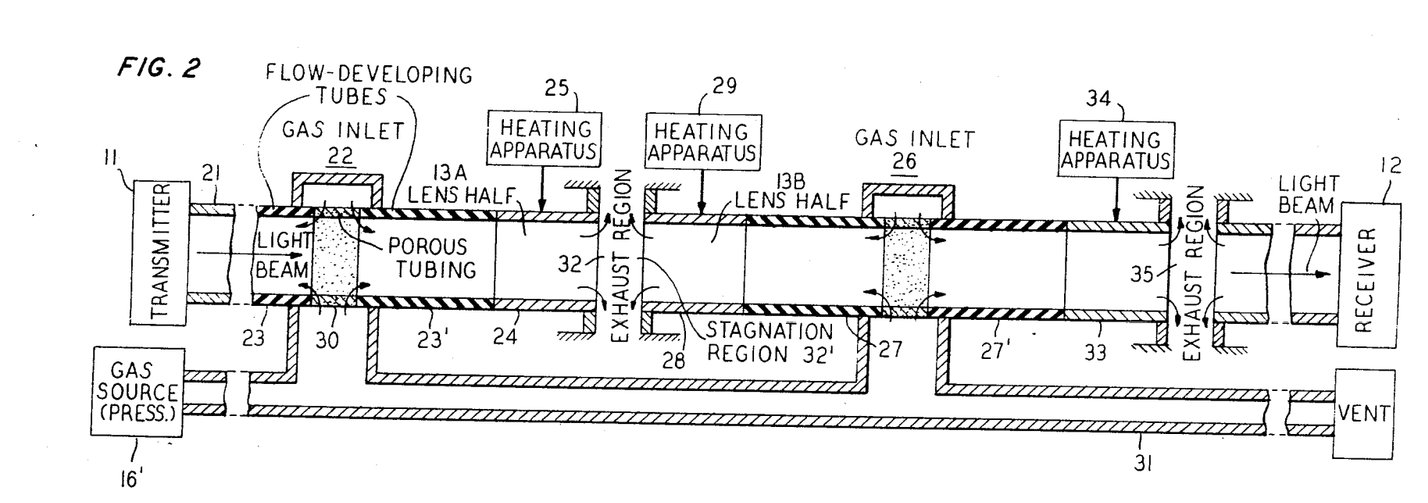
FIG. 2 is a partially pictorial and partially block diagrammatic illustration of a specific embodiment of my invention employing porous inlet tubes.

Further details of the structural interrelation of gas lens halves 13A and 13B, et cetera, with gas source and radially symmetrical exhaust are shown for one illustrative embodiment in FIG. 2.

In FIG. 2, the transmitter 11 is coupled directly to the protective conduit 21 in which the counterflow gas lenses are formed. Illustratively, gas from a source such as 16 of FIG. 1, here labeled 16', is admitted through a gas inlet 22 in insulating flow-developing sections 23 and 23' of tube 21. Each section 23, 23', extends for a sufficient axial distance to provide essentially laminar flow of gas. For example, I have found that a length of about 6 inches is adequate for a gas flow rate of 3 liters per minute per lens half, provided that no large-scale turbulence is present before the gas enters the flow-developing sections. The porous tubing 30 within gas inlet 22 substantially reduces the scale of turbulences in the inlet flow and enables shorter flow-developing tubes 23 and 23' than otherwise possible. Tubing 30 may be sintered stainless steel.

The gas then passes through a section of copper tubing 24 in the conduit 21 which is heated from a heating apparatus 25 to produce a thermal gradient that provides focusing. Illustratively, the heating produces a radial variation of temperature from the coolest temperature near the tube axis to a highest temperature on the tubing 24; and the index of refraction is consequently greatest near the center, as desired for the focusing effect. The combination of copper tube 24 and heating apparatus 25 forms the first gas lens half, such as 13A, of FIG. 1.

From a gas inlet 26 further downstream, gas from a conduit 31, extending from source 16, flows to the left through an insulating flow-developing tube section 27 of conduit 21 and enters the second gas lens half comprising the copper tube 28 and heating apparatus 29.

Between the ends of the copper tubes 24 and 28 is a substantially symmetrical gap which opens to an exhaust region 32. To compensate for gravity aberrations, the exhaust ends of tubes 24 and 28 may be lifted slightly with respect to their input ends, maintaining substantial radial symmetry of the exhaust flow. By "lifted", I refer to the relationship that tubes 24 and 28 may have axes which may be extended from the tube exhaust ends to intersect and form an obtuse angle above a reference line established by the alignment of inlets 22 and 26. Such gravity compensation will be more fully explained below in reference to FIGS. 6—9. The exhaust region 32 has a volume sufficiently great that the ultimate exhaust vents or ducts to the atmosphere or recirculating system do not substantially perturb the radial symmetry of the exhaust flow. An illustrative configuration appears hereinafter in FIG. 4.

The opposed gas flows collide head-on in the vicinity of region 32 from a stable stagnation region 32' in the center of region 32 in the vicinity of the conduit axis while exhausting substantially radially symmetrically.

Figure 3:
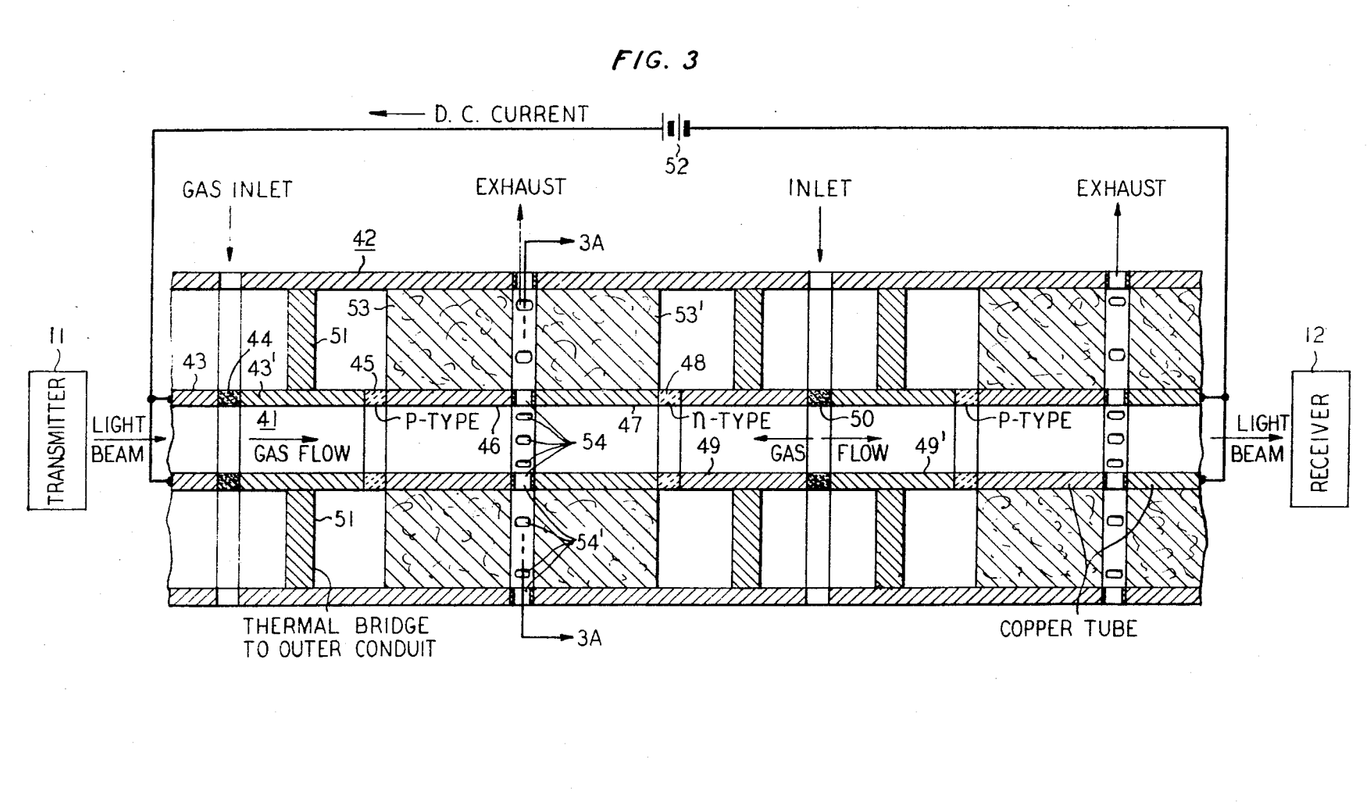
FIG. 3 is a partially pictorial and partially block diagrammatic illustration of a modification of an embodiment of FIG. 2 employing thermoelectric heating and modified symmetrical exhaust.
Figures 3A, 4:
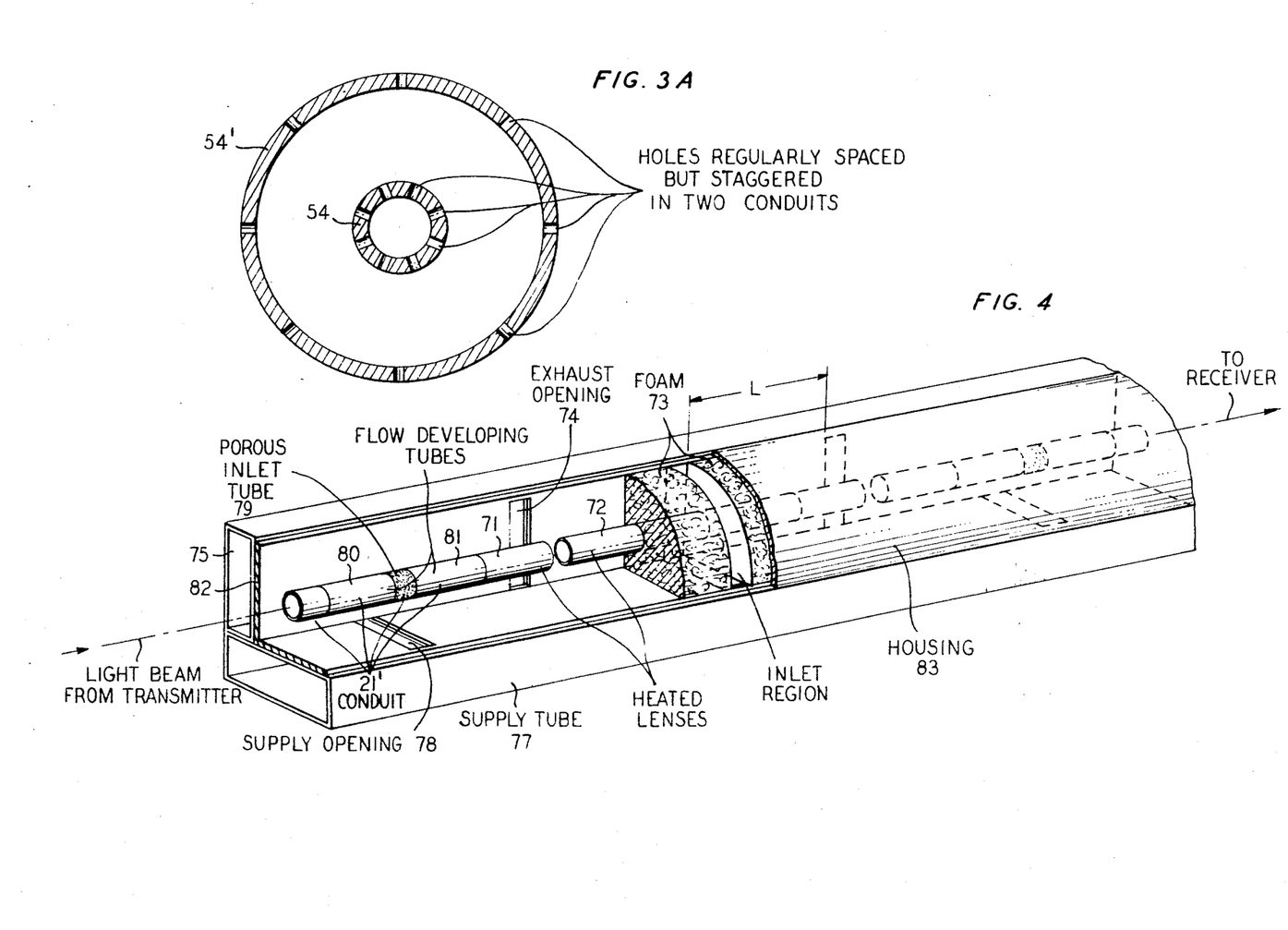
FIG. 3A is a cross-sectional view of the modified symmetrical exhaust region of FIG. 3.
FIG. 4 is a pictorial illustration of a preferred implementation of the embodiment of FIG. 1 in which the gas supply and gas exhaust tubes are integrated with the conduit for structural strength.

It will be apparent that in the case of a buried conduit 21, a suitable housing or other means for forming region 32, as in FIG. 4, is highly desirable. Various arrangements recirculating the gas, as will be described hereinafter in FIGS. 5, 6 and 7, can be employed.

Similarly, the gas flowing to the left at inlet 22 can meet an oppositely directed flow and be radially symmetrically exhausted through a radially symmetrical gap into an exhaust region; or it can be exhausted radially by impinging on a glass plate transversely positioned in the gas flow. The conduit 21 is broken at this point to simplify the illustration. Also, the gas flowing to the right from inlet 26 is developed into a laminar flow by the insulating tube 27' and introduced into a gas lens half comprising copper tube 33 and heating apparatus 34. Thereafter, it can also be radially symmetrically exhausted at region 35, which is its juncture with a gas lens half in which opposing gas flow occurs.

The specific details of the transmitter 11 and the heating apparatuses 25, 29 and 34 are not pertinent to the novelty of my invention and can assume many of the forms suggested in the prior art. For example, transmitter 11 could comprise a helium-neon laser supplying its coherent beam to a suitable electro-optic modulator supplied with an information signal. The heating apparatuses could illustratively comprise either heating coils wrapped around the respective copper tubing sections, or hot thermoelectric junctions in intimate thermal contact with the copper tubing sections. Thermoelectric materials are now readily available in cylindrical form or may be cast in any other form found appropriate for a specific embodiment, such as that of FIG. 3.

The lengths of copper tubes 24, 28 and 33 are illustratively about 15 cm.; and the length of the gaps at the center of the lens is illustratively identical to the lens radius (= 0.3175 cm.). The length of the porous tubes, such as tube 30, is typically 2.54 cm.

In the operation of the embodiment of FIG. 2, the inlet gas is supplied at a flow rate of about 3 liters per minute per lens half at a temperature of about 21° C. the temperature difference between the wall of the lens, for example, tube 24, and the inlet gas is about 60° C, for a focal length of 0.40 m. The gas temperature is not permitted to drop significantly before it meets the counterflowing gas and is radially symmetrically exhausted. The back-to-back arrangement of the gas lens halves, respectively the combination of tube 24 and heating apparatus 25 and the combination of tube 28 and heating apparatus 29, substantially reduces the effect of the gravity aberrations that would be found in either gas lens half with axial exhaust. The improvement is the result of the elimination of the axial exhaust section, which could be identified with severe gravity aberrations, particularly when the exhaust was conically shaped for colling purposes and gravity forces became more effective, due to the reduction in the axial gas velocity.

In the back-to-back counterflow arrangement of the gas lens halves, the radially symmetrical hot gas exhaust permits higher gas velocities with a stable, optically clear stagnation region at the confluence of the flows. The importance of the radial exhaust of the hot gases and the importance of exhausting them without substantial cooling has not been appreciated heretofore. Radial symmetry of the exhaust insures stable exhaust flow.

Figure 2A:
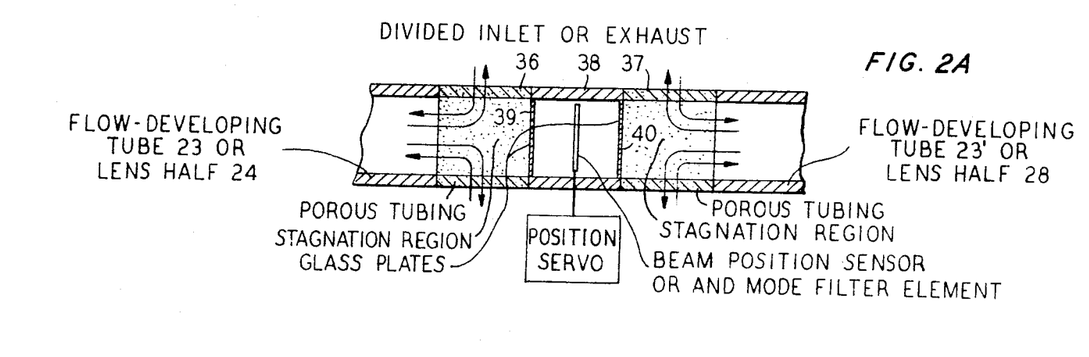
FIG. 2A shows a modification of FIG. 2 providing divided inlet or exhaust regions.

A modification of the embodiment of FIG. 2 to permit beam-sensing and filtering is shown in FIG. 2A.

Specifically, FIG. 2A illustrates divided inlet or exhaust sections which can be substituted for tubing 30 or exhaust region 32 in FIG. 2. The modified structure includes two sections 36 and 37 of porous tubing, such as sintered stainless steel, separated by nonporous tubing section 38. Nonporous tubing section 38 widens the stagnation region, so that optical mode filters, beam sensor elements, and possibly other beam control elements can be introduced therein. Section 38 may be separated from sections 36 and 37 by glass plates 39 and 40, although for a well-balanced system negligible gas flow in section 38 would occur even without the glass plates. Therefore, glass plates 39 and 40 can be omitted.

In FIG. 3, thermoelectric heating is employed in an embodiment which provides relatively great structural strength and can be readily handled.

A modulated light beam is to be transmitted from transmitter 11 to receiver 12 through an inner conduit 41. The inner conduit 41, which is securely mounted within a larger outer conduit 42, includes electrically conducting (copper) flow-developing sections such as sections 43, 43', 49 and 49', electrically conducting (stainless steel) porous inlet sections, such as sections 44 and 50, p-type thermoelectric material sections, such as section 45; copper lens-half sections, such as sections 46 and 47; and n-type thermoelectric materials sections, such as section 48.

A copper or beryllium thermal bridge 51, shaped like a washer, conducts heat to maintain ambient temperature at a flow-developing section 43', from which heat is taken by the left-hand junction of p-type material section 45. As a result of the properly chosen direction of current flow from a source 52 through inner conduit 41, the right-hand junction of section 45 is hot, the left-hand junction of n-type section 48 is also hot, and the right-hand junction of section 48 is at ambient temperature. Foam insulation sections 53 and 53' prevent heat from escaping from the copper sections 46 and 47 of the two lens halves.

To provide both the radial exhaust symmetry characteristic of my invention and the electrical continuity needed for the thermoelectric circuitry, the exhaust sections, such as inner section 54 and outer section 54', are made of slotted copper tubing sections about 0.50 cm. long. In fact, the copper tubes 46 and 47, as well as 54, may consist of one single tube, being slotted at the center. Sections 54 and 54' are shown in cross sections in FIG. 3A to illustrate the radial symmetry of slots. As seen in FIG. 3A, the slots in outer exhaust section 54' may be staggered with respect to the inner exhaust section 54. The percentage exhaust opening in tube 54 should be as high as structurally permissible.

In the operation of the embodiment of FIG. 3, gas-flow rates of about 3 liters per minute equivalent to an average gas velocity of about 1.6 meters per second are feasible, given other pertinent parameters equal to those of FIG. 2.

A further specific implementation of my invention is shown in FIG. 4. The arrangement of FIG. 4 embodies presently typical supply and exhaust techniques.

To implement this simple approach, the copper tubing sections 71 and 72 of the gas lens halves are separated by 0.3175 cm. and surrounded by foam insulation 73, partly broken away, which also has an 0.3175 cm. gap aligned with the separation of tubes 71 and 72 and also with the exhaust opening 74. The lateral extent of foam insulation 73 is sufficiently large that the disposition of exhaust opening 74 does not disturb the substantially radially symmetrical exhaust of the hot gas. The means (not shown) for heating tubing sections 71 and 72 may be an arrangement like that of FIG. 3, or may be electric heating coils energized from an approximate electrical power source. The gas exhaust pipe 75 runs parallel to conduit 21' between appropriately spaced gas pumping stations (not shown), and is coupled to exhaust openings, such as opening 74. Similarly, gas is supplied through a gas supply pipe 77 that runs parallel to conduit 21' between the gas pumping stations. It has supply openings, such as opening 78, staggered with respect to the exhaust openings and aligned with the porous inlet tubing sections such as section 79. Again, a matching opening in the surrounding supporting structure (not Shown) allows the inlet flow to be substantially radially symmetrical. Coupled to the porous tubing 79 are the flow-developing tubes 80 and 81, each about 15 cm. long for a 0.635 cm. internal diameter. Sections 80 and 81 provide laminar flow at gas velocities for which gravity aberrations are very small during subsequent heating. Radially symmetrical properties in the inlet flow arrangement around tubing section 79 are purely optional, but permit the employment of shorter flow-developing tubes and may enable savings in fabrication and installation.

The succeeding gas inlets, exhausts, and foam insulation sections are similarly arranged. Structural rigidity for the combination is provided by the L-bracket member 82, which adjoins both exhaust tube 75 and supply tube 77. An enclosure for the foam insulation 73 is completed by the curved housing 83 which is joined to the outer edges of L-bracket member 82.

The operating temperatures and flow rates are like those of the embodiment of FIG. 2.

Figure 5:
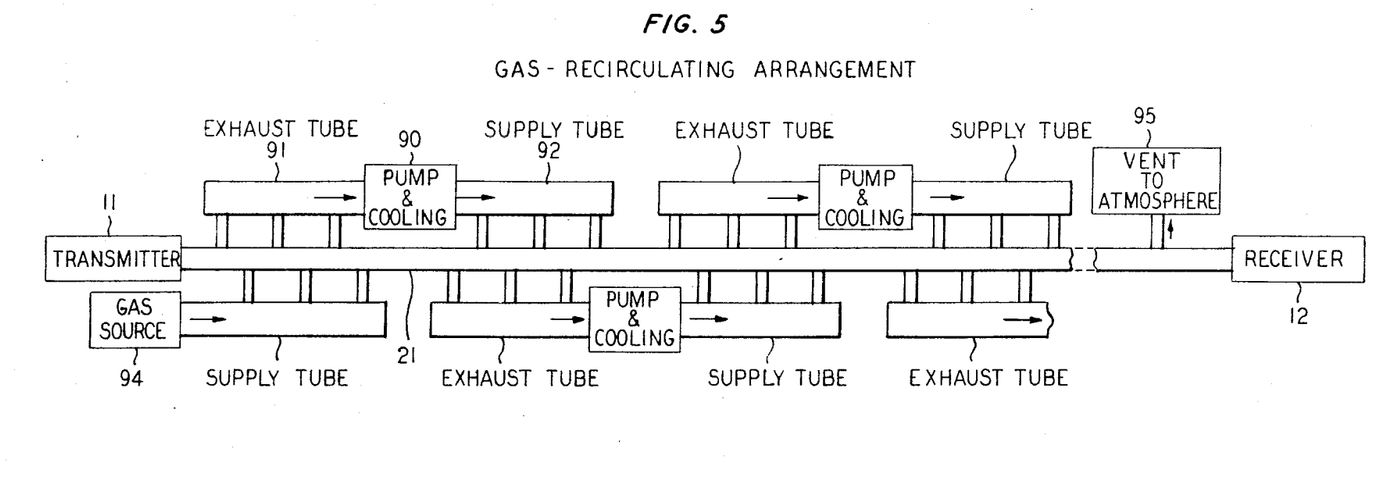
FIG. 5 is a block diagrammatic illustration of a modification of the arrangement of FIG. 4 for gas recirculation.

The embodiments of FIGS. 3 and 4 may be provided with exhaust gas cooling and recirculation, as shown schematically in FIG. 5.

A pump and a cooling device 90 coupled between a preceding gas exhaust tube 91 and a following gas supply tube 92 enables economical recirculation of the gaseous medium. Similar arrangements are repeated along conduit 21 until the gas is vented to the atmosphere, or re-collected, near repeater 12. It will be noted that gas inlets are still staggered with respect to gas exhausts to provide counterflow gas lenses.

In other respects, an embodiment according to FIG. 5 can be made similar to and can operate in the same way as either of the embodiments of FIGS. 2, 3 and 4.

Figure 6:
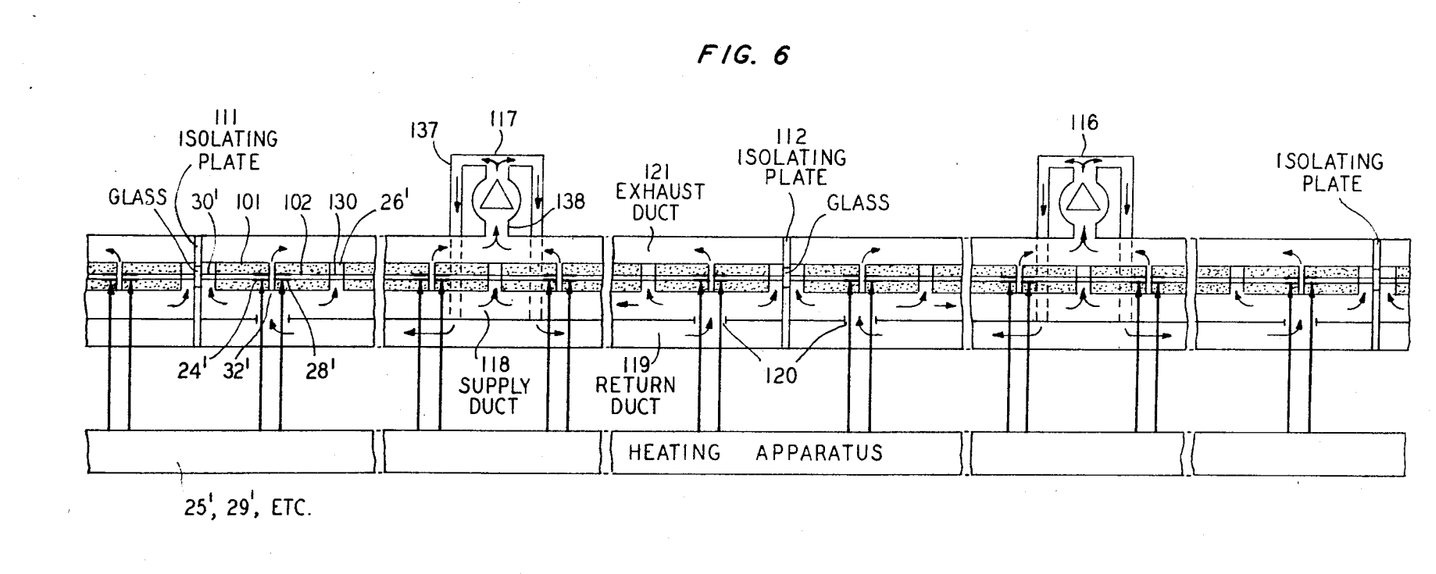
FIG. 6 is a partially pictorial and partially block diagrammatic illustration of an embodiment of the invention, modified from the embodiment of FIG. 2.

In FIG. 6 there is shown a partially pictorial and partially block diagrammatic illustration of an embodiment of the invention modified from the embodiment of FIG. 2. Where possible, similar elements have been numbered with the primed equivalents of the numbering of corresponding complements in FIG. 2. Thus, heating apparatuses 25' and 29', indicated together, supply the heat to metallic tubular members 24' and 28' as in the embodiment of FIG. 2; and a similar exhaust volume in the region 32' is provided as in the embodiment of FIG. 2.

According to a feature of my invention which is of principal interest in the embodiment of FIG. 6, the hollow metallic members 24' and 28' are tilted in the vertical plane from their inlet ends to their lifted exhaust ends at region 32' so that their axes extended from their exhaust ends make an angle above the axis defined by the inlets. The size of this angle is just sufficient to minimize the residual gravity aberrations of the embodiment of FIG. 2, while maintaining substantial radial symmetry of the exhaust of the heated gas.

It is understood that the transitional bends between the flow transition tubes and the hollow members 24' and 28' are sufficiently gradual so as to avoid a detrimental disturbance of the laminar flow. As shown in more detail in the pictorial sectional view of FIG. 7, the hollow members 24' and 28' are preferably tilted with respect to the alignment of the laminar flow-developing regions formed by insulating bodies 101 and 102. The flow-developing regions of bodies 101 and 102 are aligned with porous inlet tubes 30' and 130.

Figure 7:
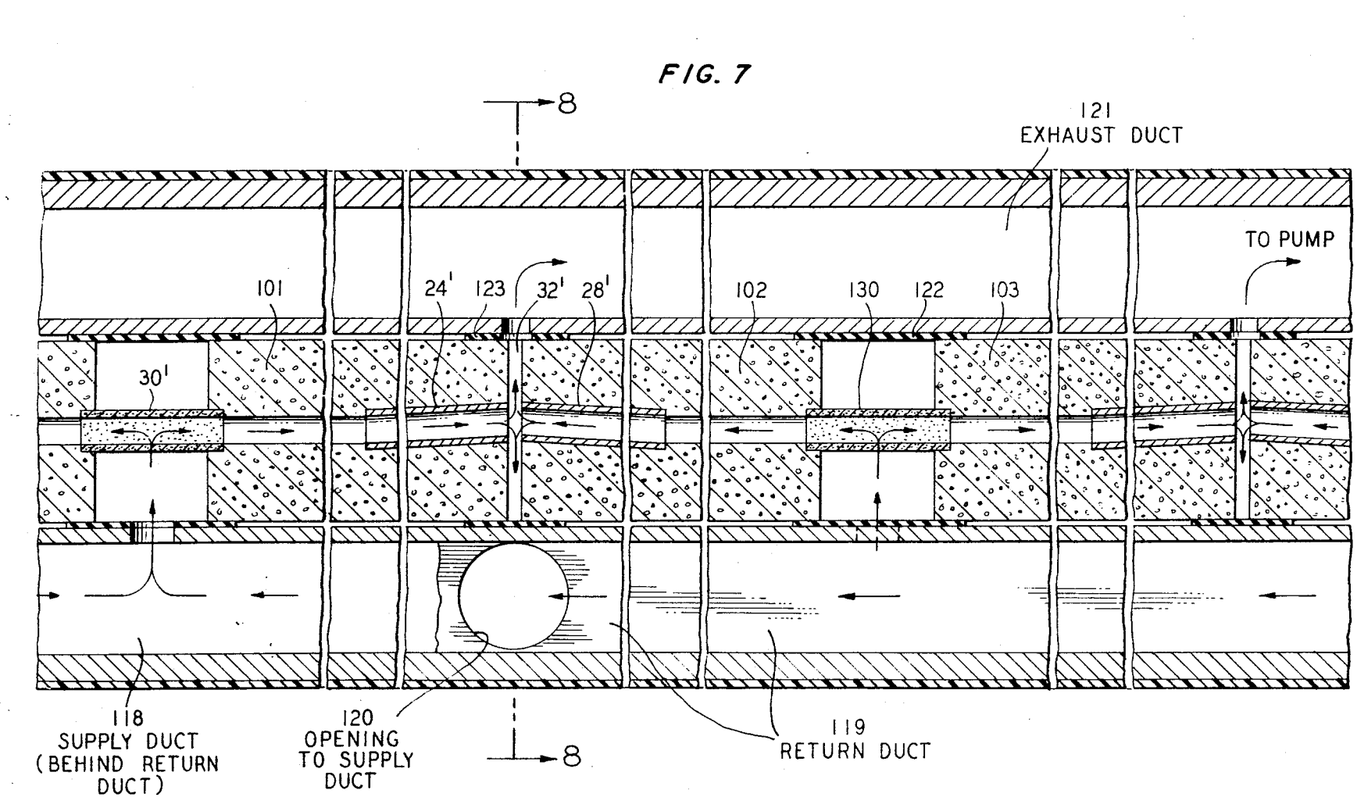
FIG. 7 is a pictorial longitudinal or axial sectional view of a preferred multiple-duct conduit structure for the embodiment of FIG. 6.

Nevertheless, it should be understood that the entire flow sections including the flow-developing regions of insulating bodies 101 and 102 and the tubes 24' and 28' could be tilted by like angles in the vertical plane of the cross section with respect to the horizontal. The inlet tubes 30' and 130 would then be the only members that would define the local alignment of the conduit. It should be noted that this latter modification is not preferred, since it tends to reduce greatly the usable cross-sectional area of the conduit, that is, the cross-sectional area through which the light beam can be propagated without risk of striking any side walls.

Returning to the more comprehensive apparatus illustrated in FIG. 6, one may see that several other desirable improvements have also been provided. For example, the isolating plates, such as plates 111 and 112 at spaced inlets, simplify the recirculation of the gas, help to stabilize the pressure drops throughout the apparatus, and serve to isolate the pumping systems on either side of them. The center portions of plates 111 and 112 within the light beam path, should be antireflection-coated glass; the outer portions may be opaque. It should also be understood that plates 111 and 112 could be inserted into the conduit in the centers of exhaust regions.

Pumps 117 and 116 on either side of plate 112 are isolated so that they do not interact. Nevertheless, if the pumps have identical characteristics and if the flow impedances of different conduit sections are sufficiently well balanced, one or more glass plates can be omitted. Under these circumstances interaction between the different conduit sections should be negligible. Due to the absence of the isolating glass plates this results in a guide with lower transmission losses.

Also of particular interest with respect to the embodiment of FIG. 6 is the fact that a three-duct gas recirculation system is employed, rather than the simpler supply and exhaust duct system of FIG. 5. The reason for this modification is to insure that the supply pressure is more nearly uniform along the supply duct 118 than could be insured if the return duct 119 were directly coupled to the gas inlets, for example, at the location of pump 117. To this end, the opening 120 from return duct 119 to supply duct 118 is disposed halfway between pumps 117 and 116. It will be seen that the pumps pump the hot exhaust gas from exhaust duct 121 to the return duct 119 at a sufficient distance from the openings 120 that substantial cooling of the gas can occur because of intimate contact of the return duct 119 with the surrounding earth, as well as by contact of exhaust duct 121 with the surrounding earth. Therefore, probably no separate cooling need be provided. However, cooling is required if the return duct is omitted and the gas is pumped into the supply duct at the location of the pump.

The relative disposition of the ducts in FIG. 6 is illustrative only. A preferred physical relationship between them may be perceived from the more detailed pictorial sectional views of FIGS. 7 and 8.

In FIG. 7 it will be seen that the return duct 119 is in front of the supply duct 118, both being at the bottom of the conduit; and that the exhaust duct 121 is at the top of the conduit.

Figure 8:
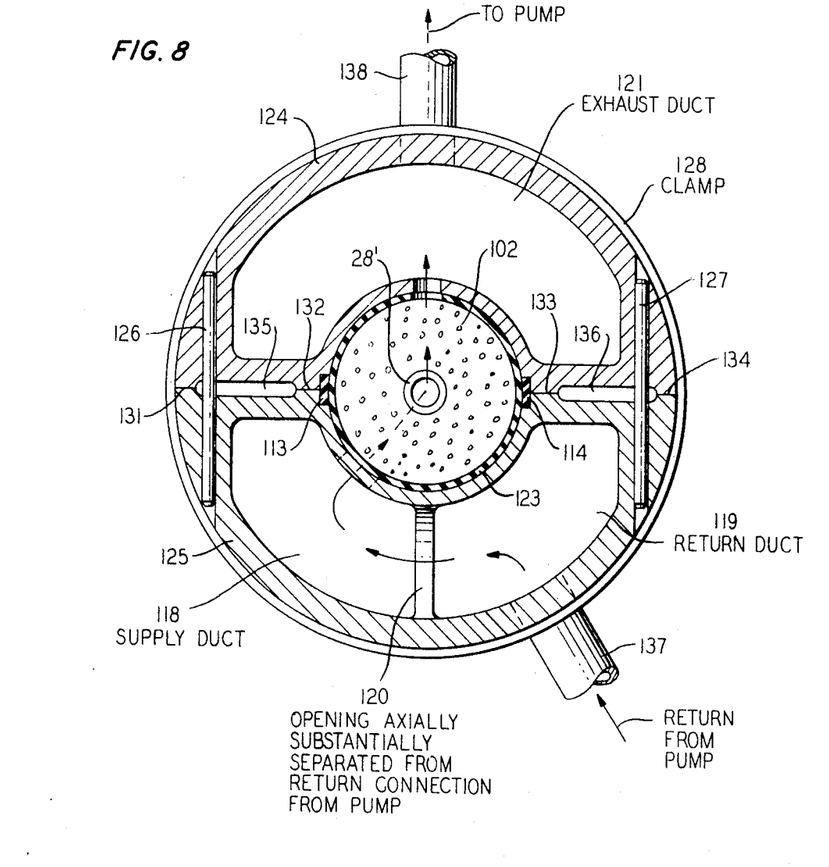
FIG. 8 is a cross-sectional view of the multiple-duct conduit structure of FIG. 7.

In the cross-sectional view of FIG. 8 it may be appreciated that the exhaust duct 121 has a substantially larger cross-sectional area and lower resistance to gas flow than the other ducts.

It will also be noted from the cross-sectional view of FIG. 8 that the conduit itself includes two castings of hemicylindrical cross section which enclose the insulating bodies such as body 102. Annular sealing members 122 (FIG. 7) and 123, and axial sealing members 113 and 114 prevent axial and radial leakage of the gas, respectively. Members 113 and 114 may run the entire length of a conduit section along the innermost line of contact of castings 124 and 125, but are required only at the inlet gap and exhaust gap. The hemicylindrical castings 124 and 125 are periodically positioned in alignment with one another by dowels 126 and 127, which are simply dropped into the appropriate holes before exterior clamps, such as clamp 128, are applied thereover.

With respect to the contacting faces of the hemicylindrical castings 124 and 125, for example in the regions 131, 132, 133 and 134, a smaller and therefore more easily machined contact area is provided by providing the cast recesses 135 and 136 therebetween.

The return pipe 137 from a pump (not shown) to return duct 119 and the exhaust pipe 138 from exhaust duct 121 to the pump may also be seen in this view (FIG. 8). The opening 120 from the return duct 119 to the supply duct 118 is substantially separated axially from the pump and its pipes 137 and 138, as indicated in FIG. 6.

Figure 9:
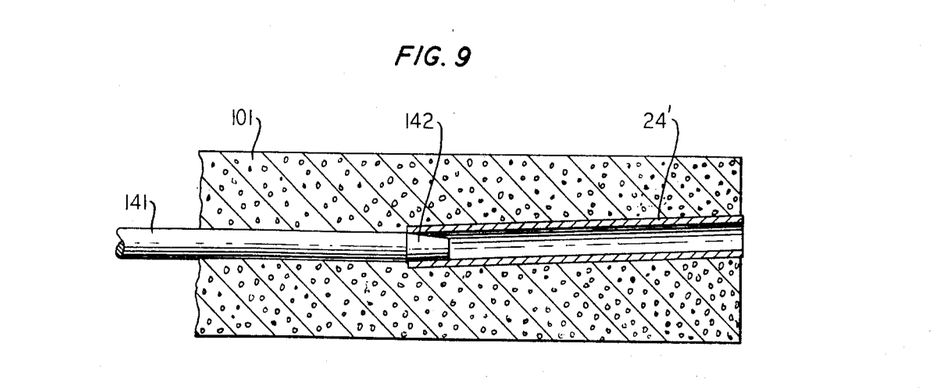
FIG. 9 is a pictorial illustration of a lens half, in accordance with a feature of the invention, tilted with respect to its connecting inlet flow-developing section, which is foamed over a mandrel.

One illustrative technique of providing the desired tilt of the heated lens halves, that is, of the heated hollow members 24' and 28' with respect to the preceding flow-developing sections, is illustrated pictorially in FIG. 9. A mandrel 141 is inserted into the end of hollow member or tube 24' of a lens half, the mandrel 141 being provided with a tapered end section 142 having a taper angle of about 4 milliradians, illustratively, so that an angle of 4 milliradians is established between the axis of mandrel 141 and the axis of tube 24'. Foam insulation is then formed over the combination of mandrel 141 and tube 24'. Mandrel 141 is previously coated with Teflon or other quick-release agent. The foam insulation, illustratively a polyurethane plastic foam, forms body 101, as illustrated in FIG. 7. To define the outer limits of body 101, a mold having a similar quick-release coating and end detents for appropriate alignment of mandrel 141 and tube 24' is closed over these members before the foam is injected.

In the operation in the embodiment illustrated in FIGS. 6 through 9, with a tilt angle of 3.9 milliradians of the heated sections and the flow-transition tubes, and with a gas flow rate of about 5.6 liters per minute, which was associated with minimized spherical aberrations, a gas lens was obtained the focal length distribution of which was constant in the horizontal plane within ±1 percent up to a relative lens radius of 0.3. Like spherical aberrations were obtained in the vertical plane. The relative lens radius is the fraction formed by the radial distance within the lens from the axis to the point associated with the pertinent state of aberrations divided by the total radius of the lens which is the inner radius of tube 24'.

A more complete set of parameters and more complete description of operation of this embodiment is as follows: The most important effect of gravity insofar as it produces distortion of the focusing properties of the gas lenses may be termed a linear focal length distortion. In addition, a less important effect exists; namely, the effective axis of focusing (optical axis) is below the mechanical axis of the heated tubes of the lens; but it can easily be compensated for by a vertical parallel displacement of the lens.

The linear focal length distortion is a linear deviation from proper focal length with distance from the effective lens center in a vertical cross section of the lens. I found that this linear term can be suppressed in a limited region close to the optical axis, if I tilted both lens halves in the vertical plane such that the center of the lens was lifted up. This inclination compensates for the gravity-induced downward tilt of the temperature and refractive index profiles. The improvement is achieved for tilt angles up to about 8 milliradians. At an angle of 3.66 mrad. and a gas-flow rate of 5.75 l./min., the distorting linear term of the focal length distribution practically disappeared, and the predominant spherical aberrations were comparable to those measured in the horizontal plane.

After the gravitational aberrations were successfully reduced, I further reduced the spherical aberrations by adjusting the flow velocity. There is some difficulty in defining the optimum distortion, however, since keeping a nearly constant focal length near the axis results in a comparatively fast deterioration at larger radii. And, conversely, an improvement at large radii is achieved only be sacrificing some focusing quality near the optical axis. At a flow rate of 5.25 l./min., the focal length is constant near the axis and decreases for relative radii larger than approximately 0.2. At high flow rates, spherical aberrations become increasingly pronounced, with the focusing power first increasing and later decreasing as function of the radius. At a flow rate of 6.0 l./min. the original focal length is reassumed at relative radii in the order of 0.45. A lens whose focal length was constant within the measuring accuracy (approximately ±2 percent) up to a relative radius of 0.35 was obtained at flow rates between 5.5 and 5.75 l./min. The tilt angle which was selected for the preceding measurements was 3.88 mrad., since this tilt resulted in smallest focal length distortions at 5.55 l./min.

If we use the measured focal length distortion of a single lens in a perturbation analysis, we can estimate the beam distortions of a guide which consists of 50 tilted counterflow lenses having lifted centers and being operated at 5.55 l./min. (lens spacing =0.75m., on-axis focal length =0.40m.). Being closely related to the transverse change of the focal length, the powers in the first and second higher order modes ($TEM_{01}$ and $TEM_{02}$) increase with growing offsets of the injected beam, become zero at a certain amplitude of initial undulation of the beam about the guide axis (which amplitude is different for both modes) and rapidly increase for larger initial amplitudes. Under the assumption that we get meaningful results only when the total converted power remains below 10 percent, the maximum permissible initial displacement amounts to less than approximately 15 percent of the lens radius for a guide with 50 lenses. This value corresponds roughly to the radius $w(=0.389cm.)$ of the ideal beam.

To obtain bending radii of the conduit as small as possible, we can approach confocal geometry and still avoid constructive interference. If we assume that the aberrations are independent of the focal length, there is little difference between a 40, 42.5 and 45 cm. focal length at 75 cm. lens spacing whereas there is a marked increase in the converted power for confocal geometry (=37.5 cm. focal length). I suggest therefore that a focal length of 40 cm. in combination with a lens spacing of 75 cm. should yield best results.

The sensitivity of the spherical aberrations to flow-rate changes represents a problem in longer guides, inasmuch as the pressure drop along the supply pipe has to be kept small. Furthermore, the subdivision of the gas flow into the lenses has to occur within tight tolerances and should be better than ±2.5 percent, or in case of $F=5.6$ l./min., better than approximately $=0.15$ l./min.

An empirical expression for the pressure drop of air flowing in a pipe is given by $$\Delta p = 0.393 \cdot 10^{-3} \frac{LF^2 n^3}{pd^{5.31}} \text{ (cm. H}_2\text{O)}. \quad (1)$$

$L$ = lens spacing $(m)$
$F$ = flow rate per lens (l./min.)
$n$ = total number of lenses
$p$ = pressure in pipe / atmospheric pressure
$d$ = pipe diameter (cm.)

This equation represents a modification of the so-called Harris formula which takes into account the linear decrease of the flow rate along the pipe. According to this formula, the pressure drop for 173 lenses, spaced 0.75m. apart and operated at a flow rate of 5.6 l./min. per lens is $\Delta p = 5.1$ cm.H$_2$O (for $d=5.4$ cm.).

Assuming a supply pressure of 190 cm. H$_2$O above atmospheric pressure and a linear relationship between supply pressure and flow rate through the porous tubes, the corresponding change in flow rate is $\Delta F \cong 0.15$ l./min.

Here we assumed that the exhaust pipe is at atmospheric pressure. Obviously, the pressure drop across the porous tubes depends also on the size and flow pattern in the exhaust pipe.

The dependence on the third power of the number of lenses ultimately determines the distance between pumping stations unless a larger diameter of the supply pipe is chosen.

In other respects the embodiment illustrated in FIGS. 6 through 9 operates in a manner similar to that of the preceding embodiments.

I claim:

1. Apparatus for guiding a beam of optical electromagnetic radiation by the formation of a radial thermal gradient across a flowing transparent gas, comprising a conduit of transverse dimensions substantially greater than the wave length of radiation to be guided therein,
a plurality of spaced means for introducing said transparent gas for flow through said conduit in opposite directions in adjacent portions thereof, including laminar flow developing regions,
means for heating said gas after passage through said regions to produce said radial thermal gradient across said gas through which radiation is to be guided, and
a plurality of means for exhausting said heated gas radially and substantially symmetrically at a stagnation region of said gas from adjacent portions of said conduit.

2. An apparatus according to claim 1 in which a pair of the heating means are disposed on opposite sides of the gas-exhausting means and form together with the gas a counterflow gas lens, the pair of heating means including respective substantially cylindrical heat-conducting tubing sections, and in which the exhausting means includes an exhaust structure providing a selected separation of said tubing sections, said structure providing a confluence of said gas from said sections and facilitating substantially radially symmetrical flow of the exhaust gases.

3. A gaseous optical guiding apparatus according to claim 2 in which the exhaust structure includes regions of internal lateral dimensions substantially larger than the internal diameter of the conduit.

4. A gaseous optical guiding apparatus according to claim 3 in which the plurality of spaced means for introducing gas include flow-developing sections integrated into the conduit with the heating means, said flow-developing sections having length suitable for establishing laminar flow of said gas.

5. A gaseous optical guiding apparatus according to claim 3 in which the spaced means for introducing gas includes a supply tube having apertures coupled to the conduit and the exhaust structure includes an exhaust tube having apertures coupled to the conduit in the vicinity of the confluences of the gas, the introducing means and the exhaust structure including sections of material surrounding said conduit and spaced to define regions of internal lateral dimensions substantially larger than the internal diameter of said conduit, said supply tube and said exhaust tube being assembled to provide rigidity for said conduit and said sections of material.

6. Apparatus according to claim 1 in which the means for heating the gas are shaped and oriented to tilt the flow of gas in the conduit upward toward the stagnation regions from the opposite directions of laminar flow and simultaneously to maintain the substantial radial symmetry of the exhaust of the heated gas at said stagnation regions.

7. Apparatus according to claim 1 in which the means for heating the gas are disposed in pairs on opposite sides of a stagnation region and include hollow heat-conducting members oriented for gas flow therethrough in directions making angles with respect to a reference line established by neighboring gas-introducing means, said angles being sufficient to substantially counteract gravity-induced aberrations and to maintain substantial radial symmetry of the exhaust of the heated gas at the stagnation regions.

8. Apparatus for guiding a beam of electromagnetic wave energy by the formation of a radial thermal gradient across a flowing transparent gas, comprising a hollow conduit in which said beam is guided, a spaced plurality of means for admitting said gas, a plurality of means for developing laminar flow of the admitted gas in both directions in said conduit, means for establishing said gradient in laminar flow regions of said gas, and a plurality of means for exhausting said gas radially and substantially radially symmetrically at confluences of said gas, said exhausting means being oriented to permit said flow in the conduit to deviate upward from the alignment of the nearest ones of said admitting means to counteract gravity-induced aberrations.

9. Apparatus according to claim 8 in which the plurality of means for developing laminar flow of the admitted gas in opposite directions comprise pairs of hollow insulating bodies aligned axially, each of the spaced plurality of admitting means comprising an inlet space between the bodies of each said pair, and the means for establishing the radial thermal gradient in laminar flow regions of the gas comprise a plurality of hollow heat-conducting means and means for heating said members, each adjacent pair of said hollow heat-conducting members having axes deviating upward from the aligned axes of the insulating bodies toward an obtuse angle intersection within the confluence of said gas.

10. Apparatus according to claim 9 including an exhaust duct coupled to said exhausting means, a supply duct coupled to said admitting means, pumping means for pumping gas from said exhaust duct at spaced intervals along said conduit, and a return duct coupling said pumping means to said supply duct at positions along said conduit intermediate said spaced intervals.